Oct. 4, 1938. H. G. HALL 2,131,839
FIBER CONDUIT JOINT
Filed June 5, 1937
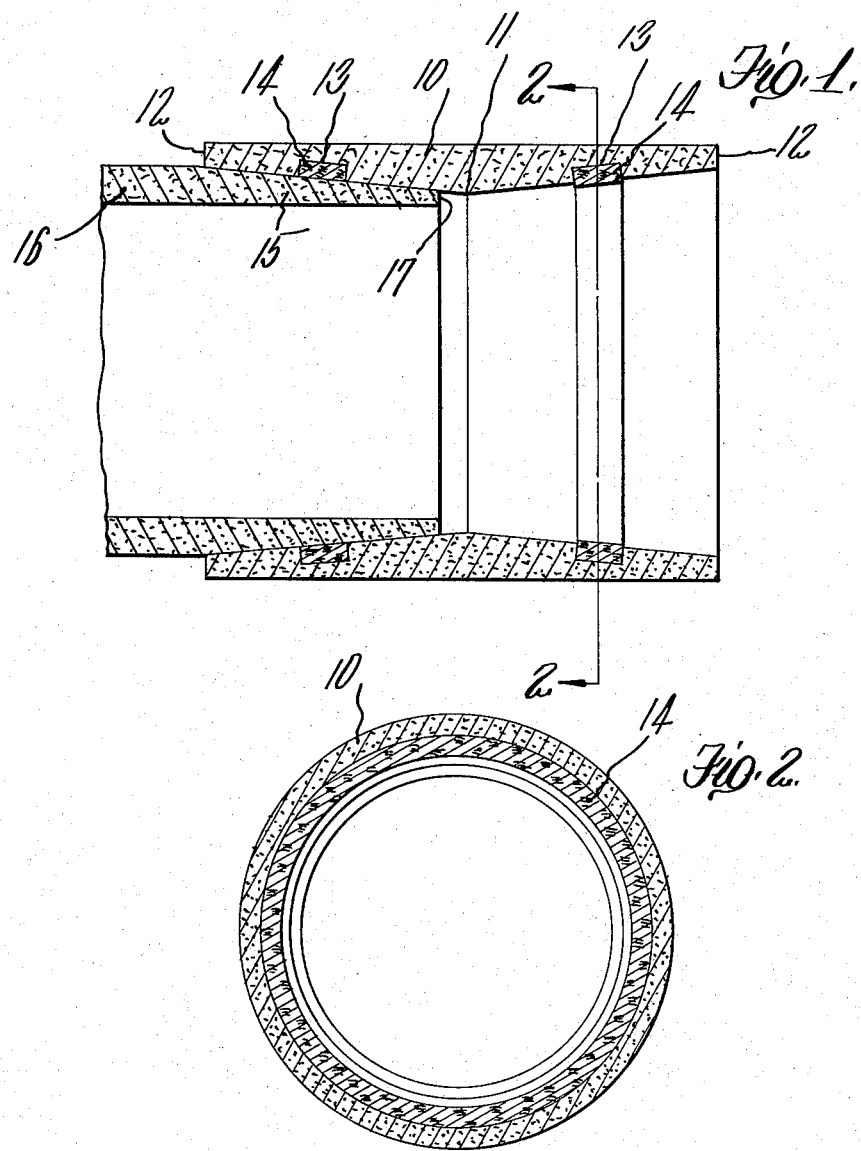
Inventor
Harry G. Hall
by Nathaniel P. Wharton
Atty Patented Oct. 4, 1938

2,131,839

UNITED STATES PATENT OFFICE 2,131,839

FIBER CONDUIT JOINT

Harry G. Hall, Detroit, Mich., assignor to The Detroit Edison Company, Detroit, Mich., a corporation of New York Application June 5, 1937, Serial No. 146,636

3 Claims. (Cl. 285—193)

This invention relates to a joint for fiber conduit and coupling used therefor. Its objective, generally speaking, is to provide a joint that is watertight and that involves minimum labor and material cost both at the factory, where the joint parts are fashioned for assembly, and in the field, where the parts are assembled or installed.

It is now common practice to house or enclose subterranean electric-wiring systems, such as electric power or telephone cables, in waterproof fiber conduit consisting essentially of conduit sections joined in end-to-end relationship. The conduit sections or tubes used for such purpose are frequently made by convoluting a wet web of papermaking pulp, as the web is being formed on a papermaking machine, into a tube of the desired wall thickness, drying the resulting tubular structure, and impregnating the dried structure with molten pitch or other suitable dielectric or waterproofing material serving to enhance the strength and rigidity of the tube wall and to lend good machinability thereto. Although conduit sections or tubes thus made withstand nicely the action of water and other subterranean elements and are otherwise well adapted for their intended use, yet they are comparatively hard and frangible, insomuch that their joinder in the desired watertight, end-to-end relationship has presented considerable difficulty. Thus, it has been found impracticable to join such conduit sections or tubes by the use of threaded couplings on account of the tendency of the threads to crack or break under such stresses as are designed to make for the desired watertightness. Again, the joinder of such conduit sections or tubes by fashioning tapered end portions and driving them into frictional engagement with complemental internal coupling walls may result in cracking of the sections or coupling, when tight driving is accomplished carelessly, and may result in leakage of water through the joint, when the driving force is applied cautiously.

The fiber conduit joint hereof is generally akin to the drive joint heretofore used in that it comprises a waterproofed fiber coupling and a pair of waterproofed fiber conduit sections whose confronting end portions have been driven through opposite ends of the coupling so as to engage frictionally the internal wall of the coupling the coupling being of progressively decreasing internal diameter from each of its ends inwardly and the end portion of each conduit section being of substantially correspondingly progressively increasing external diameter from its end outwardly of the coupling. In order to enable the desired easy driving of the end portions of the conduit sections into the coupling, the internal wall of the coupling hereof is, as heretofore, substantially smooth, but, in accordance with the present invention, an annular recess is formed in the internal coupling wall beyond each of its ends and a strip of resilient, waterproof material is fixed in such recess so that it normally protrudes slightly above the internal coupling wall. Accordingly, when the end portion of a conduit section is driven into the coupling, it serves progressively to compress the resilient, waterproof strip sufficiently to cause the outer face of such strip to lie substantially flush with the internal coupling wall, wherefore, such strip, by virtue of its compressed state and the position of its outer face immediately next to and all around the external wall of the conduit end portion, affords a substantially watertight or leakproof joint.

With the foregoing and other features and objects in view, the invention hereof will now be described in further detail with particular reference to the accompanying drawing wherein,—

Figure 1 represents a longitudinal section through the coupling hereof containing the end portion of only one conduit section driven thereinto.

Figure 2 is a transverse section through the coupling on the line 2—2 of Figure 1.

The conduit sections and the coupling serving to make up the joint hereof may be waterproofed fiber structures of the character hereinbefore described. When made of superposed, integrated plies of papermaking pulp impregnated after drying with pitch or equivalent waterproof or dielectric material, such structures are characterized by their substantial homogeneity, hardness, and good machining properties. There is hence no trouble in fashioning the walls of such structures on lathes or other machine tools to the particular form required for the purposes hereof.

As appears in Figure 1, the coupling 10 used for the joint hereof may assume essentially the form of a collar or short-length tube. The wall of such coupling or collar is of progressively diminishing thickness from a point 11 substantially midway of its length to each of its ends 12; and such diminution of wall thickness may be realized by machining or cutting away the internal wall of a short-length tube of an original wall thickness throughout corresponding to that at the point 11 where the finished coupling wall has maximum thickness. After each half of the original short-length tube has thus been internally machined to provide a substantially smooth internal wall defining a bore or socket of progressively decreasing diameter from each of the ends 12 inwardly to the point 11, an annular recess or groove 13 is cut or machined in the internal wall of each of such sockets. While the recess 13 may be formed in the internal wall at any desired region beyond each end 12, it may to advantage be located nearer such end than the mid-point 11, as such location obviates the need for driving a conduit end portion too deeply into the coupling before ensuring the desired tightness of fit or engagement of each such end portion in the coupling.

Within each groove 13 is suitably retained a strip of resilient, waterproof material 14 of such thickness or body as to protrude slightly above the internal wall surface of the coupling. Various resilient, waterproof materials, including rubber and rubber-fiber compositions, are available as the material for the strip 14, but it is preferable to use cork composition therefor by reason of the long-enduring or age-resisting qualities of such composition, its high resiliency, and its tightness of conformation with the external wall of the conduit end portion encompassed thereby.

The end portion 15 of a conduit section or tube 16 is machined or cut away to present an external diameter progressively increasing from an end 17 substantially correspondingly to the progressively decreasing internal diameter of the coupling 10 from its end 12 inwardly. In other words, the conduit end portion 15 is of tapering thickness such that its external wall surface substantially complements or mates the internal wall surface of the coupling 10 from the coupling end 12 inwardly to the coupling mid-point 11, although, if desired, there may be such slight angularity between such surfaces as will ensure tightness of engagement therebetween when the conduit end portion 15 is driven into the coupling. As the conduit end portion 15 is being driven home into the coupling 10 and is thus forced past the strip 13, it compresses such strip progressively so as to cause the strip outer surface to lie substantially flush with the internal coupling surface, wherefore, the compressed strip encompasses the external wall surface of the conduit end portion 15 under sufficiently great pressure to ensure a substantially watertight joint or seal. The joint structure hereof thus keeps water from leaking into the conduit installation in which it is used; and attack by water of the cables or electric wires housed in the installation is thus obviated. In this latter connection, it might be noted that even when a subterranean fiber conduit installation is encased in concrete, water sometimes seeps through the concrete and through the conduit joints into the interior of the conduit; and, once inside the conduit, the water tends to attack even the lead sheathings frequently provided for the electric cables or wires, especially when it has picked up in the course of its seepage acidic or other corrosive elements present in some soils.

The conduit joint hereof affords other important advantages besides watertightness. Thus, should the exterior surface of a conduit end portion present irregularities or carry particles of dirt or hard substances, such irregularities or particles become embedded in the readily conformable strip of resilient, waterproof material and thus do not interfere with the realization of the desired watertight joint. Further, the joint hereof does away with the need of using waterproof paints on the joint surfaces to ensure watertightness; and even when, by reason of storage, the conduit sections become slightly elliptical, or when there is misalignment in the installation of the conduit sections, the joint hereof remains watertight by reason of the ability of the resilient, waterproof strip to adjust itself locally about the conduit end portion while hugging or gripping the conduit end portion tightly all the way round. Again, breakage of conduit sections and couplings is minimized during installation, since the sealing pressure exerted by the resilient, waterproof strip of the joint hereof is yieldable and can readily be controlled by varying the extent of protrusion of such strip above the internal wall surface of the coupling and, accordingly, the degree of compression of such strip when a conduit section is driven home in the coupling. The cork composition for the resilient, waterproof strip of joint hereof may consist essentially of comminuted or granulated cork bonded together by any suitable binder such as asphalt, rubber, nitrocellulose cement, or equivalent waterproof binder; and, while such strip may be laid into the annular groove 13 and retained therein simply by its tendency to reassume its original flat form, yet it is preferable to coat the strip with a suitable liquid binder, preferably one that sets to a waterproof or water-insoluble condition, at the strip surfaces to contact with the walls of the groove 13 and/or to coat such walls with such binder, thereby fixing the strip in place when the binder sets.

It is to be understood that the fiber conduit joint hereinbefore described is subject to modification without departing from the spirit or scope of the invention as defined by the appended claims. Among such modifications may be mentioned the possibility of extending the inventive principles hereof to couplings of various forms, for instance, to couplings or fittings in the forms of T's, crosses, etc., in which case one or more of the sockets of such couplings or fittings may be internally shaped like the sockets of the couplings hereinbefore described and may be provided with an internal annular recess containing a resilient, waterproof strip, as hereinbefore described, for engaging tightly the tapered end portion of a conduit section driven thereinto.

I claim:

1. In a conduit joint, a rigid, waterproofed, fiber coupling comprising a socket portion of progressively decreasing internal diameter inwardly from its end and presenting an internal wall substantially smooth excepting for an annular recess formed therein, a strip of resilient, waterproof material laid into said recess and normally protruding slightly above said internal socket wall, and a rigid, waterproofed, fiber conduit comprising a tapered end portion substantially complemental to said internal socket wall and driven into said socket past said strip, whereby, as said tapered conduit end portion is thus driven, said strip is compressed progressively to lie substantially flush with said internal socket wall and thus to make substantially watertight engagement with the external wall of said tapered end portion.

2. In a conduit joint, a rigid, waterproofed, fiber coupling of essentially tubular form, substantially each half of said coupling affording a socket, a pair of rigid, waterproofed, fiber conduit sections lying end-to-end with their confronting end portions frictionally engaging the internal walls of said sockets; each of said sockets being of progressively decreasing internal diameter from its end inwardly, the end portion of each conduit section being of progressively increasing external diameter substantially corresponding to the progressively decreasing internal diameter of each socket, and the internal wall of each socket being substantially smooth excepting for an annular recess formed therein beyond its end; and a strip of cork composition laid into each of said recesses and normally protruding slightly above the internal socket wall but being progressively compressed by the end portion of a conduit section, as said conduit end portion is driven into a socket past said strip, to lie substantially flush with said internal socket wall and thus to make substantially watertight engagement with the external wall of said end portion.

3. A rigid, waterproofed, fiber coupling comprising a socket portion adapted to form a substantially watertight joint with a substantially complemental end portion of rigid, waterproofed, fiber conduit driven thereinto, said socket portion being of progressively decreasing internal diameter inwardly from its end and its bore being defined by an internal socket wall substantially smooth excepting for an annular recess formed therein, and a strip of resilient, waterproof material laid into said recess and normally protruding only so slightly above said internal socket wall as to be progressively compressed to lie substantially flush with said internal socket wall when said substantially complemental end portion of rigid, waterproof fiber conduit is driven into said socket portion.

HARRY G. HALL.